Aug. 31, 1965 J. T. BRANLEY ETAL 3,204,225
CONTROL APPARATUS
Filed July 13, 1961
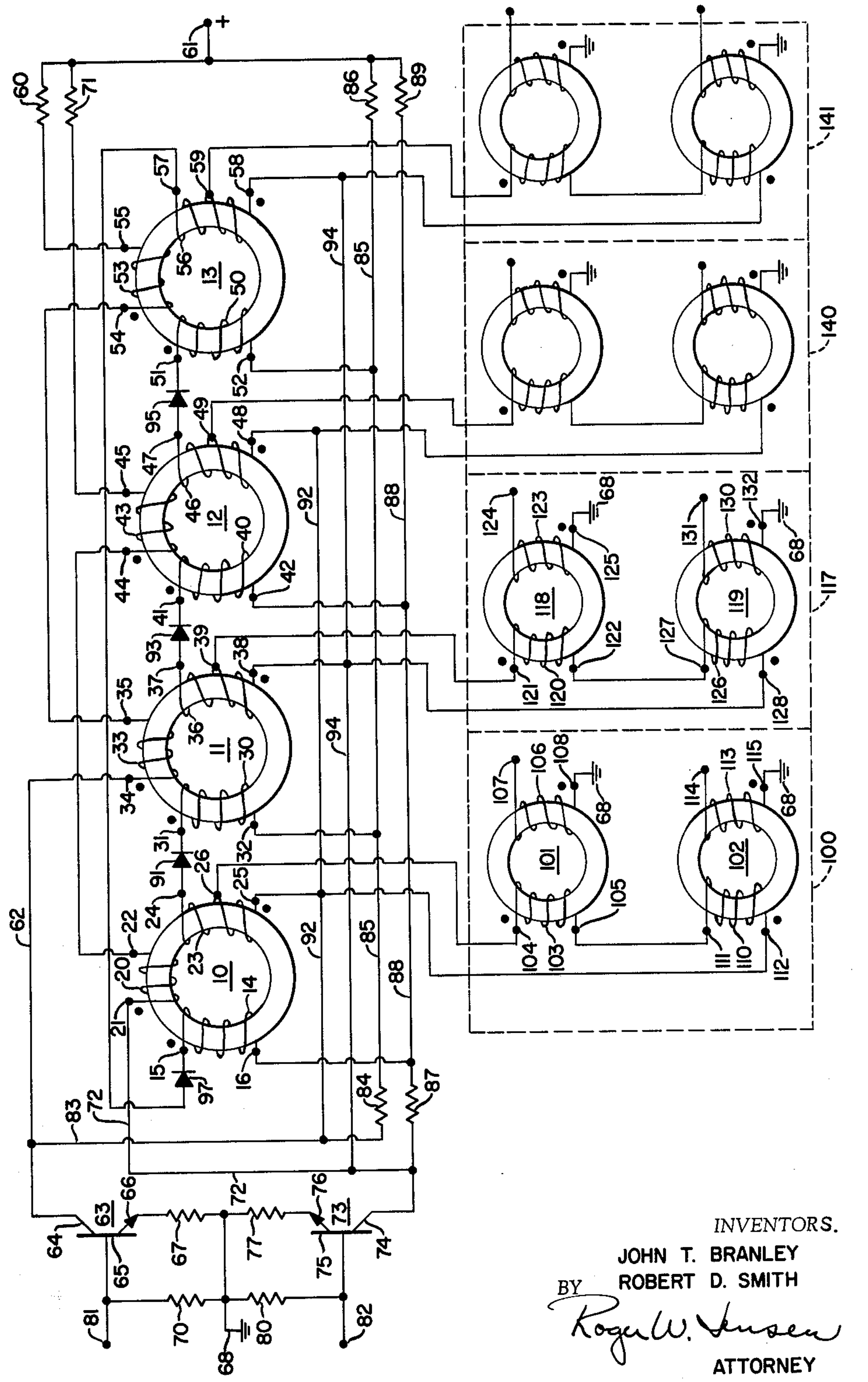
INVENTORS.
JOHN T. BRANLEY
ROBERT D. SMITH
BY Roger W. Jensen
ATTORNEY United States Patent Office 3,204,225

Patented Aug. 31, 1965

3,204,225

CONTROL APPARATUS

John T. Branley, Pinellas Park, Fla., and Robert D. Smith, Hamilton, Ohio, assignors to Honeywell Inc., a corporation of Delaware Filed July 13, 1961, Ser. No. 123,694
6 Claims. (Cl. 340—174)

This invention relates to an improvement in computer circuitry and more particularly to a serial magnetic core storage memory.

In a broad sense the invention comprises a first plurality of magnetic cores each having input, output and shift windings. The output winding of each core is serially connected by means of a diode to the input winding of the next succeeding magnetic core. The shift windings of the first and each alternate succeeding magnetic core are serially connected to a first source of control pulses. The shift windings of the second and each alternate succeeding magnetic core are serially connected to a second source of control pulses. The output winding of the last core is connected to the input winding of the first core to form a closed loop serial register.

A plurality of storage circuits each comprising first and second magnetic cores are connected across the output winding of each core of the register. The first core of each shift register has an input winding and output winding while the second core of each register has a control winding and a gate winding. The input winding of the first core and the gate winding of the second core are serially connected across the output winding of the register magnetic core. The control winding of the second magnetic core of each storage circuit is connected to a source of control pulses. When the first cores of the storage circuit is magnetized in one direction a "one" is said to be written into the core, and when the core is magnetized in the opposite direction a "zero" is said to be written into the core.

If it is assumed that the first magnetic core of the register is in the "one" state and that all the rest of the register cores are in the "zero" state, then when a pulse is applied to the shift winding of the first core this core will be shifted to its "zero" state and a pulse will appear across the output winding that is fed to the input winding of the second core writing a "one" into this core. Simultaneous with the pulse being applied to the input of the second core it is also applied to the storage circuit associated with the first magnetic core and writes a "one" into the first core of the storage circuit, provided that there is not a control pulse present at the control winding of the second core of the storage circuit. If a control pulse is present on the control winding of the second core of the storage circuit then the second core will be shifted to its "zero" state and a pulse will be induced in the gate winding of the second core which opposes the pulse applied to the input winding of the first core of the storage circuit and hence the state of the first core will remain unchanged.

As the "one" was written into the second core of the register a pulse was induced in the output winding of the second core and this pulse was fed to the storage circuit associated with the second core. The polarity of this pulse was such as to drive the second core of the storage circuit to its "one" state and the first core of the storage circuit to its "zero" state. This condition constitutes the reading process for the storage circuit.

It can be seen, therefore, that is is possible to simultaneously write into and read out of adjacent storage circuits during each current pulse applied to the register shift windings.

It is one object of this invention, therefore, to provide an improved magnetic core memory circuit.

Another object of this invention is to provide a magnetic core memory that is capable of simultaneous reading and writing on adjacent bits.

These and other objects of our invention will become apparent to those skilled in the art upon consideration of the accompanying specification, claims, and drawing of which:

The single figure is a schematic diagram of an embodiment of the invention.

Referring to the figure there are shown magnetic cores 10, 11, 12 and 13. Magnetic core 10 has an input winding 14 having end terminals 15 and 16, a shift winding 20 having end terminals 21 and 22, and an output winding 23 having end terminals 24 and 25 and a center tap terminal 26.

Magnetic core 11 has an input winding 30 having end terminals 31 and 32, a shift winding 33 having end terminals 34 and 35 and an output winding 36 having end terminals 37 and 38 and a center tap winding 39.

Magnetic core 12 has an input winding 40 having end terminals 41 and 42, a shift winding 43 having end terminals 44 and 45 and an output winding 46 having end terminals 47 and 48 and a center tap winding 49.

Magnetic core 13 has an input winding 50 having end terminals 51 and 52, a shift winding 53 having end terminals 54 and 55 and an output winding 56 having end terminals 57 and 58 and a center tap terminal 59.

Terminal 55 of shift winding 53 is connected by means of a resistor 60 to a source of energizing potential 61. Terminal 54 of shift winding 53 is directly connected to terminal 35 of shift winding 33. Terminal 34 of shift winding 33 is connected by means of a conductor 62 to a collector 64 of a transistor 63. Transistor 63 further has a base 65 and an emitter 66. Emitter 66 is connected by means of a resistor 67 to a common conductor, in this case ground 68. Base 65 of transistor 63 is connected by means of a resistor 70 to ground 68.

Potential source 61 is further connected by means of a resistor 71 to terminal 45 of shift winding 43. Terminal 44 of shift winding 43 is directly connected to terminal 22 of shift winding 20. Terminal 21 of shift winding 20 is connected by means of a conductor 72 to a collector 74 of a transistor 73. Transistor 73 further has a base 75 and an emitter 76. Emitter 76 of transistor 73 is connected to ground 68 by means of a resistor 77. Base 75 of transistor 63 is connected by means of a resistor 80 to ground 68. Bases 65 and 75 of transistors 63 and 73 respectively are adapted to be connected to a source of positive square wave pulses, or clock pulses.

Collector 64 of transistor 63 is further connected by means of a conductor 83, a resistor 84, a conductor 85 and a resistor 86 to the positive potential source 61.

Collector 74 of transistor 73 is further connected by means of a resistor 87, a conductor 88 and a resistor 89 to the positive potential source 61.

Terminal 24 of output winding 23 of core 10 is connected by means of a diode 91 to terminal 31 of input winding 30 of core 11. Terminal 25 of output winding 23 is connected by means of a conductor 92 to conductor 83. Terminal 32 of input winding 30 of core 11 is connected to conductor 85.

Terminal 37 of output winding 36 of core 11 is connected by means of a diode 93 to terminal 41 of input winding 40 of core 12. Terminal 42 of input winding 40 is connected to conductor 88. Terminal 38 of output winding 36 is connected by means of a conductor 94 to conductor 72.

Terminal 47 of output winding 46 of core 12 is connected by means of a diode 95 to terminal 51 of input winding 50 of core 13. Terminal 52 of input winding 50 is connected to conductor 85. Terminal 48 of output winding 46 is connected to conductor 92.

Terminal 57 of output winding 56 of core 13 is connected by means of a diode 97 to the terminal 15 of input winding 14 of core 10. Terminal 16 of winding 14 is directly connected to conductor 88. Terminal 58 of output winding 56 is connected to conductor 94.

A storage circuit 100 has a first magnetic core 101 and a second magnetic core 102. Magnetic core 101 has an input winding having end terminals 104 and 105, and an output winding 106 having end terminals 107 and 108. Magnetic core 102 has a gate winding 110 having end terminals 111 and 112, and a control winding 113 having end terminals 114 and 115.

Another storage circuit 117 has a first magnetic core 118 and a second magnetic core 119. Magnetic core 118 has an input winding 120 having end terminals 121 and 122, and an output winding 123 having end terminals 124 and 125. Magnetic core 119 has a gate winding 126 having end terminals 127 and 128 and a control winding 130 having end terminals 131 and 132. Terminal 105 of input winding 103 of storage circuit 100 is directly connected to terminal 111 of gate winding 110. Terminal 104 of input winding 103 is directly connected to the center tap terminal 26 of output winding 23 of magnetic core 10. Terminal 112 of gate winding 110 is directly connected to terminal 25 of output winding 23. Terminal 108 of output winding 106 of magnetic core 101 is connected to ground 68.

Terminal 114 of control winding 113 of magnetic core 112 is adapted to be connected to a source of control pulses. Terminal 115 of control winding 113 is connected to ground 68.

Terminal 122 of input winding 120 of storage circuit 117 is directly connected to terminal 127 of gate winding 126. Terminal 121 of input winding 120 is connected to the center tap terminal 39 of magnetic core 11. Terminal 128 of gate winding 126 is connected to terminal 38 of output winding 36. Winding 123 of core 118 of storage circuit 117 has its end terminal 125 connected directly to ground 68. Control winding 130 of magnetic core 119 has its end terminal 131 adapted to be connected to a source of control pulses, and its end terminal 132 connected directly to ground 68.

Two more storage circuits 140 and 141 are substantially identical to storage circuits 100 and 117. Storage circuit 140 is connected from the center tap terminal 49 to the end terminal 48 of output winding 46 of core 12, while storage circuit 141 is connected from the center tap terminal 59 to the end terminal 58 of output winding 56 of magnetic core 13.

While we have shown a register comprising four magnetic cores, this is for the purpose of illustration only and it is to be understood that a register as short as two bits, or as long as is allowed by the voltage limitation imposed by the drivers, and the resistance of the series connected shift windings, may be constructed from these basic circuits. Furthermore, while we have shown only one storage circuit connected to the output of each register magnetic core, it should be understood that more than one storage circuit can be driven from each register core.

*Operation*

In order to explain the operation of the circuits of the figure, certain arbitrary definitions are necessary. Current flow into the dotted end of a winding is defined as resulting in a positive remanant flux state of the core, and current flow out of the dotted end of a winding is defined as resulting in a negative flux state. A positive flux state is further defined as representing a binary "one" state, and a negative flux state is defined as representing a binary "zero" state.

To explain the operation of the circuit of the figures, assume that core 10 is in its positive flux or "one" state, and that the remainder of the register cores are in their negative flux or "zero" state. Assume further that a positive pulse is applied to terminal 82 and hence to base 75 of transistor 73. The positive pulse at input terminal 82 causes a current flow from the base 75 to emitter 76 of transistor 73 and resistor 77 to ground. This base to emitter current flow turns transistor 73 to its "on" or conducting state. When transistor 73 conducts current flows from positive potential source 61, through resistor 71, shift winding 43 of magnetic core 12, shift winding 20 of magnetic core 10, conductor 72, collector 74 to emitter 76 of transistor 73 and resistor 77 to ground.

The current flow through shift winding 43 of core 12 is such as to tend to set core 12 to its "zero" state. However, since core 12 is already in its "zero" state the current through shift winding 43 has substantially no effect, and there is no output induced in output winding 46. However, the current flow through shift winding 20 also tends to set core 10 to its "zero" state and since core 10 is in its "one" state the core switches, and an output pulse is induced in output winding 23, the pulse being of such a polarity that winding terminal 24 is positive with respect to terminal 25. With terminal 24 of output winding 23 positive with respect to terminal 25, current will flow from terminal 24 through diode 91, input winding 30 of core 11, conductor 85, resistor 84 and conductor 92 to terminal 25 of output winding 23. The current flowing through input winding 30 of core 11 sets core 11 from its "zero" state to its "one" state. Core 10 is now in its "zero" state and core 11 is in its "one" state, or in other words, the circulating "one" has been moved or "shifted" from core 10 to core 11.

When transistor 73 conducts current also flows from the positive potential source 61 through resistor 89, conductor 88, resistor 87, collector 74 to emitter 76 of transistor 73, and resistor 77 to ground 68. The current flow through resistor 87 develops a volt drop across this resistor which is coupled through the input windings of the even numbered magnetic cores 10 and 12, and back-biases diodes 97 and 93 and prevents the output of the shifted magnetic core from being dissipated in an undesirable manner. In the example just given the back-biasing of diode 97 prevents a reverse transfer of energy through diode 97 to core 13 when core 10 was shifted from its "one" state to its "zero" state.

Assume now that a positive pulse is applied to clock input terminal 81. This positive pulse causes a current flow from terminal 81 through the base 65 to emitter 66 of transistor 63 and resistor 67 to ground 68, turning transistor 63 to its conducting or "on" state. When transistor 63 conducts current will flow from the positive potential source 61 through resistor 60, shift winding 53 of magnetic core 13, shift winding 33 of magnetic core 11, conductor 62, collector 64 to emitter 66 of transistor 63 and resistor 67 to ground 68. The current flow through shift winding 53 of magnetic core 13 will have little effect on core 13 since this core is already in its "zero" state. However, the current flow through shift winding 33 of core 11 switches core 11 from its "one" state back to its "zero" state. When magnetic core 11 changes from its "one" state to its "zero" state a pulse is induced in output winding 36 such that terminal 37 of winding 36 is positive with respect to terminal 38. This induced voltage in output winding 36 causes current to flow from terminal 37 through diode 63, input winding 40 of magnetic core 12, conductor 88, resistor 87, and conductor 94 to terminal 38 of winding 36. The current flow through input winding 40 of magnetic core 12 switches core 12 from its "zero" state to its "one" state.

When transistor 63 conducts a current will also flow from the positive potential source 61 through resistor 86, conductor 85, resistor 84, collector 64 to emitter 66 of transistor 63, and resistor 67 to ground 68. The current flow through resistor 84 induces a voltage across this resistor which is coupled through the input windings 30 and 50 of magnetic cores 11 and 13 respectively and back-biases diodes 91 and 95, thereby preventing an undesirable dissipation of output energy when the core is shifted.

From the above explanation it can be seen that core 12 is now in its "one" state and that the circulating "one" has again been shifted one position in the circulating register. When another pulse is applied to clock input 82 transistor 73 will again conduct and will cause a current flow through shift winding 43 of core 12 which will return core 12 to its "zero" state and induce a voltage in output winding 46 of core 12 which will produce a current flow through the input winding 50 of magnetic core 13 switching core 13 to its "one" state. It can thus be seen that each time that alternating clock pulses are applied to the clock inputs 81 and 82 the circulating "one" is shifted one position in the circulating register.

To explain the operation of the storage circuits 100, 117, 140 and 141, assume that register magnetic core 13 is in its "one" state and that a clock input pulse is applied to input terminal 81. As explained hereinbefore the presence of a clock pulse at terminal 81 will cause transistor 63 to conduct and a current to flow through shift winding 53 of magnetic core 13 causing core 13 to be set to its "zero" state. When core 13 is switched to its "zero" state a pulse will be induced in the output winding 56 of core 13 such that end terminal 57 is positive with respect to terminal 58 and a current will flow from terminal 57 through diode 97, input winding 14 of register magnetic core 10, resistor 87, conductor 72, and conductor 94 to terminal 58 of output winding 56. The current flow through the input winding 14 of magnetic core 10 sets core 10 to its "one" state. When magnetic core 10 is switched from its "zero" state to its "one" state a voltage is induced in output winding 23 such that terminal 25 is positive with respect to terminal 26. Current then flows from terminal 25 through gate winding 110 of magnetic core 102, and input winding 103 of magnetic core 101 to terminal 26 of output winding 23 of magnetic core 10. The current through gate winding 110 of magnetic core 102 sets core 102 from its "zero" state to its "one" state. The current flow through input winding 103 of magnetic core 101 sets core 101 to its "zero" state, providing that core 101 was not already in this state. It can be seen that if core 101 had been in its "one" state, the current flow through input winding 103 would have switched this core to its "zero" state. This constitutes the reading process of storage circuit 100.

Assume now that a pulse is applied to clock input terminal 82 so that transistor 73 conducts. As explained previously the conduction of transistor 73 will cause a current flow through shift winding 20 of core 10 which sets core 10 to its "zero" state. The switching of core 10 induces a voltage into output winding 23 such that terminal 26 is positive with respect to terminal 25, and a current flows from terminal 26 through input winding 103 of magnetic core 101 and gate winding 110 of magnetic core 102 to terminal 25 of output winding 23. Since this current flow is into the dotted end of input winding 103 core 101 will be set to its "one" state, and since the current flow is out of the dotted end of gate winding 110 of core 102, core 102 will be set to its "zero" state.

However, assume that as core 10 of the circulating register was switched from its "one" state to its "zero" state a positive square wave control pulse was applied to terminal 114 of control winding 113 of magnetic core 102. This positive pulse will switch magnetic core 102 from its "one" state to its "zero" state and a voltage will be induced in gate winding 110 of core 102 such that terminal 111 is positive with respect to terminal 112. This induced voltage opposes the voltage induced in output winding 23 of magnetic core 10 due to the switching of core 10, and hence no current flows through input winding 103 of magnetic core 101 and therefore core 101 remains in its "zero" state. This constitutes the writing process for storage circuit 101, the presence of a current pulse on control winding 113 writes a "zero" into magnetic core 101 and the absence of a current pulse on control winding 113 writes a "one" into magnetic core 101. It can be seen from the above description of operation that reading and writing occur simultaneously on adjacent storage circuits during each shift pulse applied to the circulating register cores.

It is to be understood that while we have shown a specific embodiment of our invention, that this is for the purpose of illustration only and that our invention is to be limited solely by the scope of the appended claims.

We claim as our invention:

1. Code storage apparatus comprising: first and second substantially rectangular hysteresis loop magnetic cores each having shift, input, and center tapped output windings; means for connecting said shift windings to a coded signal; means connecting the extremities of the output winding of each magnetic core to the input windings of the other magnetic core; first and second storage circuits each having first and second further substantially rectangular hysteresis loop magnetic cores, said first further magnetic cores having input and output windings and said second further magnetic cores having gate and control windings, said control windings being responsive to control pulses; and circuit means serially connecting the input and gate winding of said first and second storage circuits respectively to the center taps of the output windings of said first and second magnetic cores.

2. Code storage apparatus comprising: a rectangular hysteresis loop magnetic core, diode, circulating register, said register having a plurality of outputs; a plurality of storage circuits each having first and second magnetic cores, said magnetic cores being in the "zero" state when magnetized in one direction and in the "one" state when magnetized in the other direction, the first magnetic core having input and output windings and the second magnetic core having control and gate windings; circuit means serially connecting the input and gate windings of each of said storage circuits to a separate one of said plurality of outputs of said circulating register, said output and gate windings being wound so that the output of the circulating register will magnetize said first and second magnetic cores in the opposite directions; and circuit means for connecting said control windings to control pulses, said control windings being wound so that current flow in these windings will induce a voltage in the gate windings that will oppose the output of said circulating register.

3. Apparatus of the class described comprising: a plurality of substantially rectangular hysteresis loop magnetic cores each having an input winding, a shift winding and a center tapped output winding; means for serially connecting said first and each succeeding alternate shift winding to a first source of pulses; means for serially connecting said second and each succeeding alternate shift winding to a second source of pulses; circuit means connecting the extremities of the output winding of each core to the input winding of the next succeeding core, said circuit means including diode means; means for connecting said first and each succeeding alternate input winding, and said second and each succeeding alternate input winding, in circuit with said first and second pulse sources respectively so as to prevent a voltage from being induced in said input windings when a pulse is applied to the respective core shift windings; a plurality of storage circuits each having an input and an output and comprising in combination, first and second further magnetic cores, said first further substantially rectangular hysteresis loop magnetic core having an input winding and an output winding and said second further magnetic core having a control winding and a gate winding, said input winding and said gate windings being wound so that a signal applied to these windings will magnetize said first and second magnetic cores in opposite directions, means serially connecting the input winding of said first further magnetic core and the gate winding of said second further magnetic core to the input of said storage circuit, means connecting the output winding of said first further core to the output of said storage circuit, and means for connecting the control winding of said second further core to a source of control pulses; and means connecting the inputs of said plurality of storage circuits to the center taps of the output windings of said plurality of magnetic cores.

4. Code storage apparatus comprising: a plurality of substantially rectangular hysteresis loop magnetic cores each having a shift, input, and center tapped output windings; means for connecting the first and each succeeding alternate shift winding to a first coded signal; means for connecting the second and each succeeding alternate shift winding to a second coded signal; circuit means connecting the extremities of the center tapped output winding of said magnetic cores to the input winding of the next successive core, the output winding of the last core being connected to the input winding of the first core, said circuit means including diode means; circuit means for connecting the first and each succeeding alternate diode means to a third coded signal and the second and each succeeding alternate diode means to a fourth coded signal, said third coded signal being in synchronism with second coded signal and said fourth coded signal being in synchronism with said first coded signal, said third and fourth coded signals providing back bias for the respective diodes; a plurality of storage circuits each having an input and an output and comprising in combination, first and second substantially rectangular hysteresis loop magnetic cores each having first and second windings wound in inductive relation thereto, means for serially connecting the first windings of said first and second cores to said input said first windings being wound so that said first and second cores are magnetized in opposite directions upon the application of a pulse to said input, means for connecting the second winding of said second core to a source of control signals the second winding of said second core being wound so that the application of a control pulse to said second winding will induce a voltage in the first winding of said second core that opposes the pulse supplied to said input, and means connecting the second winding of said first core to said output; and circuit means connecting the input of said storage circuits respectively to the outputs of said magnetic cores.

5. Apparatus of the class described comprising: first and second substantially rectangular hysteresis loop magnetic cores each having shift, input, and center tapped output windings; means for connecting said first shift winding to a first signal; means for connecting said second shift winding to a second signal; means connected the extremities of the output windings of said magnetic cores to the input windings of the other magnetic cores; first and second storage circuits each having first and second further substantially rectangular hysteresis loop magnetic cores, said first further magnetic cores having input and output windings and said second further magnetic cores having gate and control windings, said control windings being responsive to control pulses; and circuit means serially connecting the input and gate windings of said first and second storage circuits respectively to the center taps of the output windings of said first and second magnetic cores.

6. Apparatus of the class described comprising: first and second substantially rectangular hysteresis loop magnetic cores each having first and second windings wound in inductive relation thereto; means for serially connecting the first windings of said first and second cores to a pulse source, said first windings being wound so that current flow in these windings will magnetize said first and second cores in opposite directions; means for connecting the second winding of said second core to a source of control signals, said second winding of said second core being wound so that the application of a control pulse to said second winding of said second core will induce a voltage in the first winding of said second core that opposes the pulse supplied to said first winding of said first core; and means for connecting the second winding of said first core to a load.

References Cited by the Examiner

UNITED STATES PATENTS

| | | | |
|---|---|---|---|
| 2,666,151 | 1/54 | Rajchman et al. | 340—174 |
| 2,781,504 | 2/57 | Canepa | 340—174 |
| 2,784,390 | 3/57 | Chien | 340—174 |
| 2,805,020 | 9/57 | Lanning | 340—174 |
| 2,846,667 | 8/58 | Goodell et al. | 340—174 |
| 2,887,675 | 5/59 | Lo et al. | 340—174 |
| 2,943,301 | 6/60 | Loev et al. | 340—174 |
| 2,983,828 | 5/61 | Samuel | 340—174 |

IRVING L. SRAGOW, *Primary Examiner.*